United States Patent
Nollenberger (10) Patent No.: US 9,409,442 B2
(45) Date of Patent: Aug. 9, 2016

(54) AXIAL SECURING RING, BEARING ARRANGEMENT AND PRODUCTION METHOD THEREFOR

(71) Applicant: GETRAG Getriebe-und Zahnradfabrik Hermann Hagenmeyer GmbH & Cie KG, Untergruppenbach (DE)

(72) Inventor: Frank Nollenberger, Besigheim (DE)

(73) Assignee: GETRAG GETRIEBE-UND ZAHNRADFABRIK HERMANN HAGENMEYER GMBH & CIE KG, Untergruppenbach (DE)

( * ) Notice: Subject to any disclaimer, the term of this patent is extended or adjusted under 35 U.S.C. 154(b) by 0 days.

(21) Appl. No.: 14/620,128

(22) Filed: Feb. 11, 2015

(65) Prior Publication Data

US 2015/0224821 A1 Aug. 13, 2015

(30) Foreign Application Priority Data

Feb. 11, 2014 (DE) .......................... 10 2014 101 645

(51) Int. Cl.
*F16C 43/00* (2006.01)
*B60B 27/00* (2006.01)
*F16C 35/073* (2006.01)
(Continued)

(52) U.S. Cl.
CPC ............. *B60B 27/0078* (2013.01); *F16C 19/54* (2013.01); *F16C 35/067* (2013.01); *F16C 35/073* (2013.01); *F16C 19/06* (2013.01); *F16C 2226/74* (2013.01); *F16C 2361/61* (2013.01); *F16H 57/023* (2013.01)

(58) Field of Classification Search
CPC ... B60B 27/0078; F16H 57/021; F16C 19/54; F16C 35/067; F16C 35/07; F16C 35/077; F16C 35/073; F16C 2361/61; F16C 19/06; F16C 2226/74; F16C 33/586
See application file for complete search history.

(56) References Cited

U.S. PATENT DOCUMENTS

| 1,989,750 | A | 2/1935 | Garrett |
| 2,051,704 | A | 8/1936 | Harris |

(Continued)

FOREIGN PATENT DOCUMENTS

| DE | 19 69 834 U | 10/1967 |
| DE | 19730749 A1 | 1/1998 |

(Continued)

OTHER PUBLICATIONS

Partial European Search Report for Application No. EP 20150153111, dated Jul. 24, 2015, in 9 pages.

(Continued)

*Primary Examiner* — Adam D Rogers
(74) *Attorney, Agent, or Firm* — Knobbe Martens Olson & Bear LLP (57) ABSTRACT

A bearing arrangement is provided having an axial securing ring that inserts into a bearing-seat radial groove of a bearing carrier to secure an anti-friction bearing axially in relation to the bearing carrier. The axial securing ring is an open flat ring with an annular section. Radially projecting lugs are provided at each end of the annular section. The radial width of the annular section is substantially constant over the circumference of the annular section. The lugs are produced by bending the axial securing ring with respect to the annular section. The axial securing ring is plane-ground on its axial sides.

7 Claims, 3 Drawing Sheets (51) Int. Cl.
 *F16C 35/067* (2006.01)
 *F16C 19/54* (2006.01)
 *F16C 19/06* (2006.01)
 *F16H 57/023* (2012.01)

(56) References Cited

U.S. PATENT DOCUMENTS

| | | | |
|---|---|---|---|
| 3,401,436 A | | 9/1968 | Bradshaw |
| 5,785,433 A | | 7/1998 | Takahashi et al. |
| 8,740,467 B2 | * | 6/2014 | Ravenna ............. B60B 27/0005 384/537 |
| 9,127,714 B2 | * | 9/2015 | Mola .................... F16C 33/586 |
| 2005/0105840 A1 | * | 5/2005 | Muranaka ............... B60B 27/00 384/544 |
| 2007/0107166 A1 | | 5/2007 | Kastner et al. |
| 2008/0053270 A1 | | 3/2008 | Wakabayashi et al. |
| 2008/0111377 A1 | | 5/2008 | Nauer |

FOREIGN PATENT DOCUMENTS

| | | | | |
|---|---|---|---|---|
| DE | 10236618 | A1 | | 2/2004 |
| DE | 10 2004 052 105 | A1 | | 4/2006 |
| DE | 10 2006 061 408 | A1 | | 6/2008 |
| DE | 20 2012 102 395 | U1 | | 7/2012 |
| DE | 10 2011 003 323 | A1 | | 8/2012 |
| DE | 20 2014 100 535 | U1 | | 2/2014 |
| DE | WO 2015074648 | A1 | * | 5/2015 ............ F16C 35/063 |
| JP | S53-150349 | U | | 11/1978 |
| JP | S54-152837 | A | | 10/1979 |
| JP | H02 116009 | U | | 9/1990 |
| JP | 2004-068850 | A | | 3/2004 |
| JP | 2008115997 | A | | 5/2008 |
| JP | 2009-133376 | A | | 6/2009 |
| JP | 2009-150463 | A | | 7/2009 |
| JP | 2013-113305 | A | | 6/2013 |
| WO | WO 2013/159919 | A1 | | 10/2013 |
| WO | WO 2014/001211 | | | 1/2014 |

OTHER PUBLICATIONS

Search Report issued Jan. 4, 2016 in EP Application No. 15153111.8.

* cited by examiner

AXIAL SECURING RING, BEARING ARRANGEMENT AND PRODUCTION METHOD THEREFOR

CROSS-REFERENCE TO RELATED APPLICATIONS

This application claims the priority of German patent application DE 10 2014 101 645, field on Feb. 11, 2014, the content of which application is incorporated herein by reference.

BACKGROUND

The present invention relates to an axial securing ring for inserting into a radial groove, the axial securing ring being configured as an open flat ring with an annular section, at the ends of which in each case radially projecting lugs are provided, the radial width of the annular section being substantially constant over the circumference.

Furthermore, the present invention relates to a method for producing an axial securing ring.

In addition, the present invention relates to a bearing arrangement, in particular for mounting a shaft on a bearing carrier of a motor vehicle drive train, having a bearing carrier which has a bearing seat with a bearing-seat radial groove, having an anti-friction bearing which has a bearing radial groove on a bearing ring and which is inserted into the bearing seat, having an axial securing ring which engages into the bearing-seat radial groove and into the bearing radial groove, in order to secure the anti-friction bearing axially in relation to the bearing carrier, the axial securing ring being configured as an open ring with radially projecting lugs.

Finally, the present invention relates to a method for producing a bearing arrangement.

A multiplicity of solutions are known for axially securing anti-friction bearings which serve, for example, to mount a shaft on a housing of a section of a motor vehicle drive train, such as a gearbox.

In a solution of this type, the shaft can have an internal thread at its axial end, a hollow screw being screwed into the internal thread, in order to secure the anti-friction bearing on the shaft axially. This embodiment is comparatively robust and requires only a comparatively small amount of axial installation space. However, this solution is comparatively expensive.

A further concept for axial securing consists in screwing a screw through a threaded bore in a housing cover, which screw pulls a holding plate against the housing cover on its inner section, which holding plate engages on a circumferential groove of a bearing ring of the anti-friction bearing.

A further possibility consists in using axial securing rings which are as a rule received as standard circlips in a coaxial circlip groove.

In addition, there are a multiplicity of different designs in axial securing rings. The axial securing rings can firstly be punched from a metal sheet. Here, a very wide variety of shapes of the axial securing ring can be realized, including those with lugs, without lugs, with eyes for attaching tools, etc. The radial width can also either be constant or different over the circumference.

A further possibility consists in realizing the shape of the axial securing ring by way of a winding operation, as has been disclosed, for example, by document U.S. Pat. No. 1,989,750. Axial securing rings of this type can be produced very inexpensively, but the radial width over the circumference is necessarily substantially constant here. Although this leads to very favourable part prices, the uniform shape over the circumference results in an unfavourable bending-open behaviour, a high space requirement additionally being required during bending open.

A wound axial securing ring of this type can be produced, for example, from a tempered strip material or from a tempered wire material.

It is also conceivable to provide lugs at the ends of an open wound axial securing ring of this type, by a punching operation being carried out at the ends. Mounting holes can also be integrated here. As a result of the further work step, however, this leads to high part prices on account of high tooling costs. This also results in a high gap size tolerance, since a thermal treatment is required as last manufacturing step.

In order to produce lugs, it is also possible to bend the free ends away radially and to trim them in an axial securing ring which is manufactured from a tempered wound strip. This also leads to comparatively favourable part prices with low tooling costs. In addition, high precision can be achieved, since a thermal treatment no longer takes place after the winding. However, the detailed designing is not simple on account of the disruptive contour in the bending radius. Axial recesses are possibly to be provided in the region of the bearing-seat radial groove.

Circlips in accordance with the DIN standard (also called what are known as "Seeger rings") have radially projecting lugs and a radial width which is smaller in the region of the lugs than in the region which lies diametrically opposite the lugs. As a result, the bending-open behaviour can be improved considerably. However, the necessary radial installation space is relatively large on account of the large groove depths. This can lead to installation space problems in gearboxes with short axle spacings.

SUMMARY

Against this background, it is an object of the invention to specify an improved axial securing ring, an improved method for producing it, an improved bearing arrangement and an improved method for producing a bearing arrangement, at least one of the above disadvantages being avoided.

In the axial securing ring mentioned at the outset, this object is achieved by virtue of the fact that the lugs are produced by way of bending with respect to the annular section, the axial securing ring being plane-ground on its axial sides.

Furthermore, the above object is achieved by a method for producing an axial securing ring, in particular an axial securing ring according to the invention, having the steps: bending an open ring with an annular section from a wire or strip material, at the ends of which in each case radially projecting lugs are configured, a radial width of the annular section being substantially constant over its circumference; and having the further step of plane-grinding the open ring on its axial sides, and/or having the further step of adapting the lugs at their free ends to a circular shape, the center point of which corresponds to a center point of the annular section.

An axial securing ring of this type can firstly be produced inexpensively. In particular, the axial securing ring can be produced from a tempered wire or strip material, to be precise by way of a winding operation. Warping in the bending radius can result from bending away of the lugs. An exact axial thickness of the axial securing ring results, however, by way of the subsequent plane-grinding on the axial sides, at least in the region of the bending radius, with the result that high accuracy for the shaft positioning can be achieved. Additional cut-outs on the housing are not necessary. Furthermore, the axial securing ring can be stored satisfactorily.

As a result of the radially projecting lugs, the axial securing ring can additionally be mounted reliably and manually or by machine. Furthermore, an anti-rotation safeguard for operation can be realized. In addition, the axial securing can be implemented in a radially very small installation space on account of the radial constant width of the annular section.

The trimming of the axial securing ring in the region of the free ends of the lugs can take place, for example, by way of punching.

The axial thickness of the axial securing ring is preferably constant over the entire circumference. In general, it is also conceivable, however, to configure the axial securing ring in a wedge-shaped manner, in order to achieve axial tolerance compensation.

If punching of the ends of the radially projecting lugs takes place, any desired shape of the radially projecting lugs can also be produced in a punching operation of this type.

The axial securing ring is suitable for securing an anti-friction bearing on a shaft, but can also be realized as a shaft securing ring or a bore securing ring.

The lugs preferably project radially to the outside. In this case, the axial securing ring is preferably bent open elastically from a basic state, in order to release a bearing seat, for example. In general, it is also conceivable, however, to provide an axial securing ring with radially inwardly projecting lugs, in which case the axial securing ring is bent together from a basic state, in order to release a cylindrical outer face.

It is particularly preferred if the annular section is bevelled or rounded on its inner circumference.

This embodiment applies, in particular, to the case where the lugs project radially to the outside. In this case, reliable threading of the inner circumference into a groove can take place as a result of the bevelling or rounding of the inner circumference, after the axial securing ring has been bent open radially for mounting or dismantling.

In an axial securing ring which is bent together radially for mounting purposes, bevelling or rounding can also be configured on the outer circumference.

According to a further preferred embodiment which represents an independent invention in conjunction with the axial securing ring being configured as an open flat ring with an annular section, at the ends of which in each case radially projecting lugs are provided, the radial width of the annular section being substantially constant over the circumference, wherein the lugs are adapted at their free ends to a circular shape, the center point of which corresponds to a center point of the annular section.

This measure makes it possible in a simple way to check after mounting whether the axial securing ring has latched in completely, for example into a bearing radial groove.

It goes without saying that the adaptation of the free ends of the lugs to a circular shape applies to the state where the axial securing ring is substantially relieved, that is to say is not deformed elastically.

In a refinement of this type, the check as to whether an axial securing ring engages correctly into a radial groove can also take place, for example, by way of automated visual detection systems.

In the bearing arrangement which is mentioned at the outset, the above object is achieved according to one aspect of the invention by virtue of the fact that the axial securing ring is an axial securing ring according to the invention.

The bearing carrier is preferably a housing of a section of a motor vehicle drive train, such as a gearbox housing.

According to one particularly preferred embodiment, the bearing carrier is a housing which, at one axial end, has a housing cover, on the inner side of which the bearing seat is configured.

Here, the housing cover is preferably configured in one piece with a substantially cylindrical section of the housing, with the result that the housing is configured in the manner of a cup housing.

A cup housing of this type has an opening at an axial end which lies opposite, via which opening the axial securing ring can be introduced and can be inserted into the bearing-seat radial groove. Furthermore, the anti-friction bearing which is to be secured axially in relation to the housing can be introduced via a housing opening of this type.

According to one particularly preferred embodiment, the bearing carrier is a housing with a housing cover, a mounting opening being configured in the housing cover, which mounting opening is configured in such a way that access to the lugs of the axial securing ring is made possible via the mounting opening, in order to elastically deform the axial securing ring for the purpose of mounting or dismantling the anti-friction bearing.

Although the axial securing ring is therefore introduced, for example, via a housing opening and is inserted into the bearing-seat radial groove, the elastic deformation of the axial securing ring does not take place via the housing opening, but rather via a mounting opening in the housing cover. As a result, the bearing arrangement can be produced efficiently.

Accordingly, the above object is also achieved by a method for producing a bearing arrangement, in particular a bearing arrangement according to the invention, having the steps: provision of a housing which has a housing opening at one axial end and a housing cover at the other axial end, on the inner side of which housing cover a bearing seat with a bearing-seat radial groove is configured, the housing cover having a mounting opening; an axial securing ring, in particular of the type according to the invention, being provided, and the axial securing ring being introduced into the housing via the housing opening and first of all being inserted into the bearing-seat radial groove; the axial securing ring being elastically deformed by means of a tool (which can be actuated manually or by machine) which is guided through the mounting opening in such a way that the axial securing ring releases the bearing seat; and finally an anti-friction bearing being provided which has a bearing radial groove on a bearing ring, the anti-friction bearing being introduced into the housing via the housing opening and being inserted into the bearing seat; and subsequently the axial securing ring being released, with the result that it engages into the bearing radial groove on account of elastic restoring forces, in order to secure the anti-friction bearing axially in relation to the housing.

In the method according to the invention, it is preferred, furthermore, if the axial securing ring is configured as an open ring with an annular section, at the ends of which radially projecting lugs are provided, a test being carried out after the release step via the mounting opening using the position of the lugs as to whether the axial securing ring engages correctly into the bearing radial groove.

Furthermore, it is advantageous if the mounting opening is configured eccentrically with respect to an axis of the bearing seat.

As a result, the mounting opening can firstly be of comparatively small configuration, with the result that merely access to the lugs of the axial securing ring is possible via the mounting opening. The strength of the housing is therefore not impaired greatly by the mounting opening. In addition, an eccentric mounting opening can also be used to access a plurality of axial securing rings which are arranged offset in parallel, in order to fix anti-friction bearings for parallel shafts on the housing.

Furthermore, it is advantageous if at least one cut-out for the lugs of the axial securing ring is configured on the housing, which cut-out is configured radially adjacently with respect to the bearing-seat radial groove and extends over a circumferential section which makes a relative movement of the lugs in the circumferential direction possible, in order to elastically deform the axial securing ring for the purpose of mounting or dismantling the anti-friction bearing.

This measure also contributes to it being possible for the mounting opening itself to be of comparatively small configuration. This applies, in particular, if the bearing ring is widened elastically, in order to release the bearing seat. In this case, a tool can act on the lugs and can move them away from one another in the circumferential direction, the lugs entering into the cut-out.

It is particularly advantageous here if the cut-out is delimited in the circumferential direction, in order to set up an anti-rotation safeguard for the axial securing ring.

As a consequence, this makes it possible to always hold the axial securing ring in such a way that the lugs are situated in the region of the mounting opening, with the result that mounting or dismantling is always possible.

According to a further preferred embodiment which represents an independent invention in conjunction with the pre-characterizing clause of claim 5, the bearing seat has a seat axis, the bearing-seat radial groove having a radial groove axis, and the radial groove axis being offset eccentrically with respect to the seat axis.

The eccentric offset of the seat axis and the radial groove axis can be realized here in such a way that the radial depth of the bearing-seat radial groove is substantially constant over the circumference. However, the eccentric offset can also be set up by virtue of the fact that the radial depth of the bearing-seat radial groove is variable over the circumference.

Accordingly, it is provided according to a further preferred embodiment which represents an independent invention in conjunction with the precharacterizing clause of claim 1 that a radial width of an annular section of the axial securing ring is substantially constant over the circumference, a radial depth of the bearing-seat radial groove over the circumference being selected in such a way that, during its deformation for the purpose of mounting or dismantling the anti-friction bearing, the axial securing ring can be received completely in the bearing-seat radial groove, in order to release the bearing seat, and/or bears against a bottom of the bearing-seat radial groove, in order to limit the deformation of the axial securing ring.

Here, the bearing-seat radial groove preferably has the smallest radial depth in that region which lies diametrically opposite the lugs of the axial ring, said radial depth corresponding to the radial width of the axial securing ring. The depth of the bearing-seat radial groove preferably increases continuously over the circumference towards the lugs of the axial securing ring, with the result that elastic deformation of the axial securing ring is possible, in order to release the bearing seat. Here, the depth of the radial groove is preferably selected in such a way that the axial securing ring cannot be overstretched.

According to a further preferred embodiment, the bearing carrier has a second bearing seat with a second bearing-seat radial groove, a second anti-friction bearing which has a second bearing radial groove on a bearing ring being inserted into the second bearing seat, a second axial securing ring engaging into the second bearing-seat radial groove and into the second bearing radial groove, in order to axially secure the second anti-friction bearing.

On account of the radially compact overall design of the individual bearing-seat radial grooves, a bearing arrangement of this type can be of radially compact configuration overall, it being possible for a small axle spacing to be realized between the first and the second bearing seat.

It is preferable here if the bearing carrier is a housing with a housing cover, a mounting opening being configured in the housing cover, which mounting opening is configured in such a way that access to the lugs of the first and the second axial securing ring is made possible via the mounting opening, in order to elastically deform the axial securing rings for the purpose of mounting or dismantling the first and/or second anti-friction bearing.

A tool which acts via the mounting opening is preferably configured in such a way that both axial securing rings can be deformed axially at the same time and can also be held in this position, in order subsequently for it to be possible to push an arrangement with two shafts and anti-friction bearings pre-mounted thereon into the housing in the axial direction via a housing opening of the housing.

After the insertion of the anti-friction bearings into the respective bearing seats, the two axial securing rings can then be released, said axial securing rings then engaging into the respective bearing radial grooves of the anti-friction bearings on account of the elastic recovery. A check can also subsequently be carried out via the mounting opening in this embodiment as to whether both axial securing rings engage correctly into the respective bearing-seat radial grooves.

According to a further preferred embodiment, the first and the second bearing-seat radial groove are arranged offset in the axial direction here.

This measure can also contribute to it being possible for the bearing arrangement overall to be of compact configuration in the radial direction.

The axial securing rings can preferably be configured as identical parts, as a result of which the component diversity can be reduced.

Depending on the embodiment, the axial securing rings are robust and require a small amount of space, even during stretching, with the result that a mounting opening can be of comparatively small configuration. A favourable part price results, furthermore, since a minimum use of material with few machining steps is necessary. Furthermore, low tooling costs result in some embodiments, in particular when the axial securing ring is produced by winding. It is also possibly advantageous that simple dismantling is possible, since turning during operation is not permissible. Furthermore, a test as to whether reliable latching has taken place can be realized after mounting. Finally, the axial securing rings can be stored easily.

The bearing-seat radial grooves make it possible for the lugs to dip into them during mounting, in particular as a result of a suitable cut-out, and preferably at the same time prevent corotation (turning with respect to the housing is preferably nevertheless possible, however, with regard to the associated bearing ring of the anti-friction bearing).

In addition, the bearing-seat radial groove preferably has a center offset with respect to the main bore, as a result of which the constant radial width of the annular section of the axial securing ring is compensated for.

At least one of the following advantages can preferably be realized in the bearing arrangement according to the invention. Firstly, overstretching of the axial securing ring is not possible. Special cut-outs or milled-out portions on the housing make it possible for the lugs to dip in the circumferential direction and therefore make maximum opening of the axial securing ring possible. As a result of an eccentric or off-center bearing-seat radial groove, stretching which is as circular as possible becomes possible despite the substantially constant radial width of the axial securing ring over the circumference, an extremely small installation space nevertheless being possible.

A collision of the lugs is avoided by way of axially offset radial grooves, an even smaller spacing of main axles possibly being possible.

An insertion radius by way of bevels or rounded portions avoids jamming during the engaging of the axial securing ring into the associated annular groove on account of elastic deformation.

Both manual mounting by means of a tool and automated mounting are possible. An axial bearing face on the radial groove of the housing which is acceptable with regard to the surface pressure can be achieved. Testing or detecting by hand or by machine as to whether reliable latching has taken place or not is possible independently of the rotational position as a result of circular trimming of the ends of the lugs. This is because the two lugs are preferably movable at least to a limited extent within the cut-out in the circumferential direction in the relieved state (in the latched state).

The mounting opening preferably lies substantially between two main shaft axes if two axial securing rings are used. A high degree of automation is possible in the production process of the bearing arrangement. The mounting can also take place manually in other embodiments.

It goes without saying that the features which are mentioned above and which are still to be explained in the following text can be used not only in the respectively specified combination, but rather also in other combinations or on their own, without departing from the scope of the present invention.

BRIEF DESCRIPTION OF THE SEVERAL VIEWS OF THE DRAWINGS

Exemplary embodiments of the invention are shown in the drawing and will be explained in greater detail in the following description. In the drawing.

PREFERRED EMBODIMENTS

Figure 1:
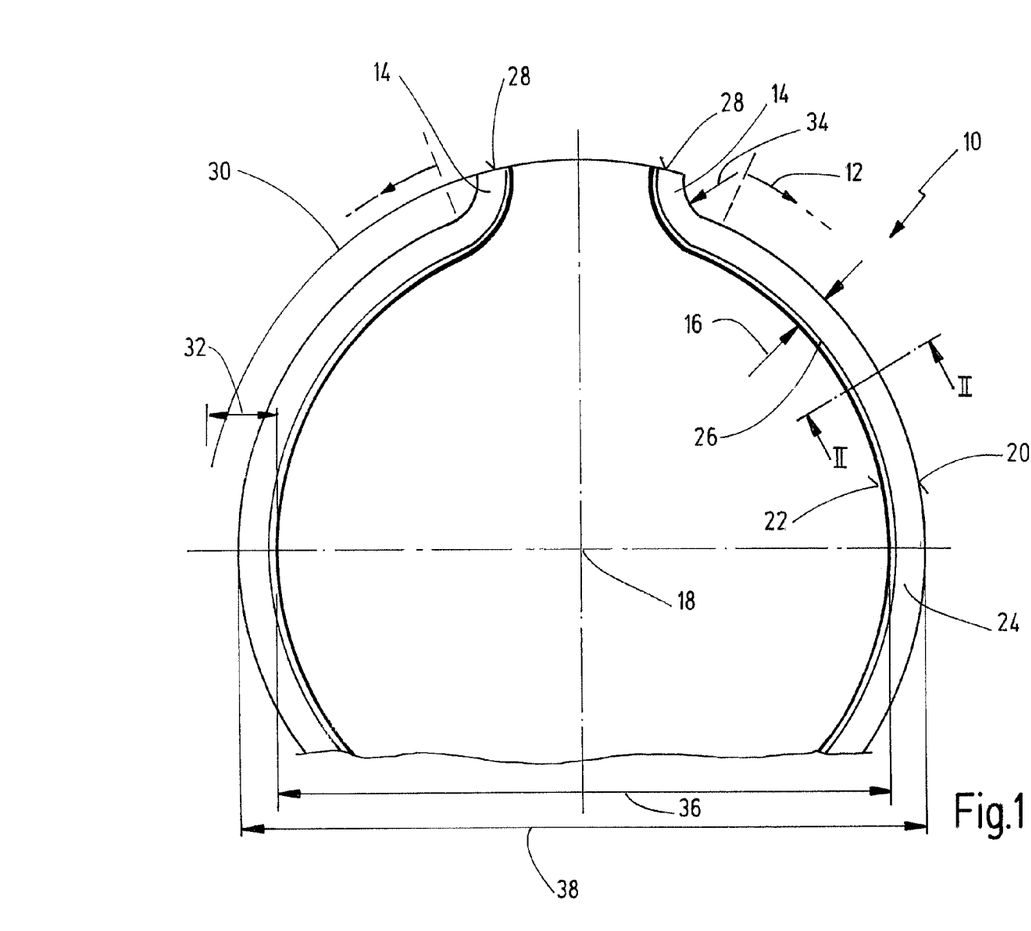
FIG. 1 shows a diagrammatic axial plan view of an axial securing ring according to one embodiment of the invention.
Figure 2:
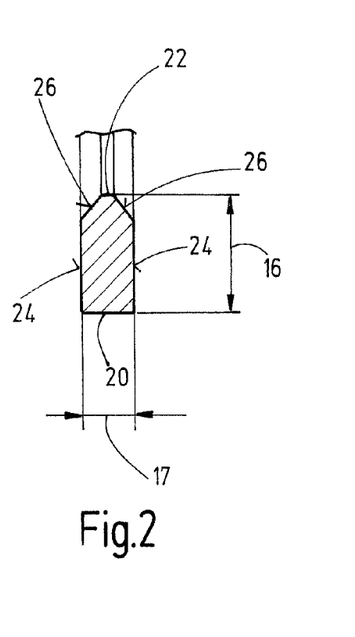
FIG. 2 shows a diagrammatic sectional view along the line II-II from FIG. 1.

FIGS. 1 and 2 diagrammatically show one embodiment of an axial securing ring 10. The axial securing ring 10 is configured as an open ring with an annular section 12 which extends over at least 300°. Lugs 14 which project radially to the outside are configured at the free ends of the annular section 12. The annular section 12 has a constant radial width 16 over the circumference and a preferably constant axial thickness 17 over the circumference. A ring axis or a center point of the axial securing ring 10 is shown at 18. The outer circumference of the annular section 12 is denoted by 20. The inner circumference of the annular section 12 is denoted by 22. The axial sides are denoted by 24.

The axial securing ring is produced from a strip material by winding, the lugs 14 being produced by way of bending with respect to the circular shape of the annular section 12. The axial securing ring 10 is plane-ground on its axial sides 24.

The axial securing ring 10 is provided with bevels 26 on the inner circumference 22. A rounded portion can also be provided instead of bevels 26. The strip material, from which the axial securing ring is produced, is already provided with said bevels or said rounded portion.

The free ends 28 of the lugs 14 are trimmed in such a way that they lie on a circular shape 30 when the axial securing ring 10 is relieved, that is to say is not elastically deformed, as shown in FIG. 1.

The spacing between the circular shape 30 and the inner circumference 22 is shown at 32. The bending radius of the lugs 14 is shown at 34.

Furthermore, FIG. 1 shows the internal diameter 36 of the axial securing ring 10 in the relieved state. The inner diameter in the widened state is shown at 38.

During elastic bending open of the axial securing ring 10, the shape of the inner diameter deviates from a circular shape. The diameters 36, 38 which are mentioned relate to a center line of the axial securing ring 10 which passes through perpendicularly with respect to a center axis of the axial securing ring 10 which is defined by the lugs 14.

The bending radius 34 preferably lies in the range from 2 mm to 4 mm. The radial width 16 preferably lies in the range from 2 mm to 5 mm. The axial thickness 17 preferably lies in the range from 1 mm to 3 mm, preferably in the range from 1.5 mm to 2 mm.

The inner diameter 36 preferably lies in the range from 45 mm to 60 mm. The ratio of the inner diameter 38 in the widened state to the inner diameter 36 in the relieved state preferably lies in the range from 1.05 to 1.2, in particular in the range from 1.09 to 1.4. The inner diameter 38 in the widened state is preferably the maximum widening diameter.

Figure 3:
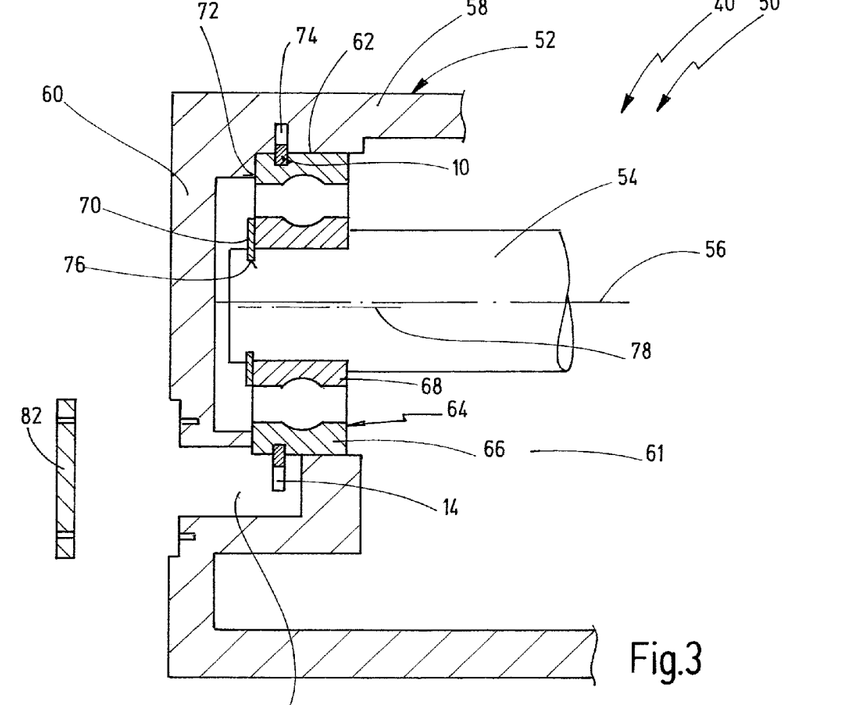
FIG. 3 shows a diagrammatic longitudinal sectional view through one embodiment of a bearing arrangement according to the invention.

FIG. 3 diagrammatically shows a part of a motor vehicle gearbox 40 which has a bearing arrangement 50.

The bearing arrangement 50 comprises a housing 52 as bearing carrier, it being possible for the housing 52 to be a housing of the motor vehicle gearbox 40. Furthermore, the bearing arrangement 50 comprises a shaft 54 which is mounted rotatably in relation to the housing 52. A shaft axis of the shaft 54 is denoted by 56.

The housing 52 has a housing base 58 which extends substantially in the axial direction. Furthermore, the housing 52 comprises a housing cover 60 which can be configured in one piece with the housing base 58, but can also be configured as a separate component which is connected to the housing base 58.

The housing cover 60 is configured at one axial end of the housing 52. At the axial end which lies opposite, the housing base 58 has a housing opening 61, via which components of the motor vehicle gearbox 40 can be mounted in the housing 52.

A bearing seat 62 is configured on an inner side of the housing cover 60 or adjacently with respect thereto. The bearing seat 62 serves to receive an outer ring of an anti-friction bearing 64 which is configured for mounting the shaft 54.

The anti-friction bearing 64 has the outer ring 66 which is preferably pressed into the bearing seat 62, and an inner ring 68 which is fixed on the shaft 54 via an axial fixing means 70.

The bearing seat 62 defines an axial stop 72 from the outer ring 66. A bearing-seat radial groove 74 is configured in the region of a circumferential section of the bearing seat 62. Furthermore, the outer ring 66 comprises a bearing radial groove 76 on its outer circumference.

The bearing-seat radial groove 74 has a center axis 78 which is configured eccentrically with respect to the shaft axis 56, the shaft axis 56 being configured concentrically with respect to a seat axis of the bearing seat 62.

A mounting opening 80 is configured in the housing cover 60, eccentrically with respect to the shaft axis 56. The mounting opening 80 can be closed by a cover 82.

In order to mount the bearing arrangement 50, first of all an axial securing ring 10 is inserted into the bearing-seat radial groove 74 via the housing opening 61. The axial securing ring 10 can be an axial securing ring as shown in FIGS. 1 and 2.

Subsequently, the shaft 54 with the anti-friction bearing 64 which is fastened thereto by means of the axial fixing means 70 is pushed into the housing 52 via the housing opening 61. In order to permit insertion of the outer ring 66 of the anti-friction bearing 64 into the bearing seat 62, the cover 82 of the mounting opening 80 is removed, and the axial securing ring 10 which has previously been inserted into the bearing-seat radial groove 74 is widened radially by means of a tool which is introduced via the mounting opening 80, with the result that the axial securing ring 10 releases the bearing seat 62. Subsequently, the outer ring 66 can be pushed or pressed axially into the bearing seat 62. Finally, the axial securing ring 10 is released again, with the result that it is relieved elastically and engages into the bearing radial groove 76. The radial depth of the bearing radial groove 76 is selected in such a way that the inner circumference 22 preferably bears over the entire circumference against the bottom of the bearing radial groove 76.

The introduction of the axial securing ring 10 into the bearing radial groove 76 is facilitated by the bevels 26. Jamming can be avoided as a result.

The lugs 14 of the axial securing ring 10 both lie in such a way that they lie in an axial projection in the region of the mounting opening 80. This makes it possible to elastically widen the axial securing ring 10 via the mounting opening 80. Furthermore, it is made possible as a result that, after the release of the axial securing ring 10, a check can be carried out via the position of the lugs 14 as to whether said axial securing ring 10 has latched reliably into the bearing radial groove 76.

Figure 4:
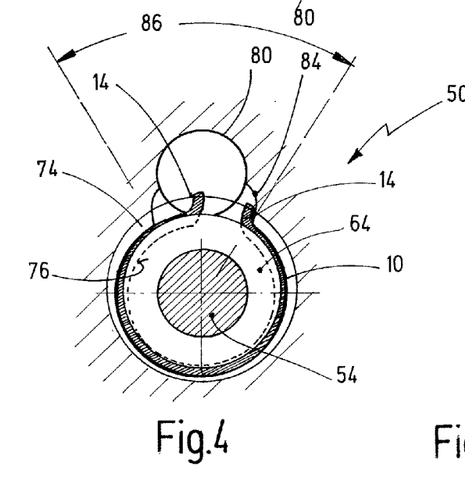
FIG. 4 shows a diagrammatic axial plan view of a further embodiment of a bearing arrangement according to the invention with an axial securing ring in the mounted state.

FIG. 4 diagrammatically shows the view shown in FIG. 3 in an axial view or cross-sectional view.

It can be seen that the mounting opening 80 intersects tangentially with the bearing-seat radial groove 76. Furthermore, it can be seen in FIG. 4 that a cut-out 84 for the lugs 14 is configured in a region approximately radially outside the bearing-seat radial groove 74 and adjacently with respect to the mounting opening 80. The cut-out 84 extends over a circumferential section 86 which makes widening of the axial securing ring 10 possible, by the lugs 14 being moved away from one another in the circumferential direction, for example by means of a suitable tool. The circumferential section, over which the cut-out 84 extends, is denoted by 86 in FIG. 4. The circumferential section 86 can extend, for example, over an angular range from 45° to 90°, preferably over an angular range from 50° to 70°.

FIG. 4 diagrammatically shows the axial securing ring 10 in such a way that it engages into the bearing-seat radial groove 74. Furthermore, the axial securing ring 10 engages into the bearing-seat radial groove 74, which cannot be seen, however, on account of the illustration of FIG. 4, since FIG. 4 also shows the anti-friction bearing 64 in an axial plan view. The engagement of the axial securing ring 10 into the bearing radial groove 76 is indicated merely diagrammatically using dashed lines in FIG. 4.

Figure 5:
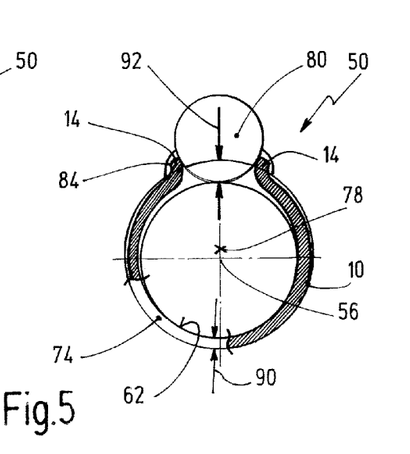
FIG. 5 shows a comparable view to FIG. 4 with an axial securing ring in the widened state.

FIG. 5 shows a comparable view to FIG. 4, the axial securing ring 10 being shown in the widened state. It can be seen that the axial securing ring 10 completely releases the inner circumference of the bearing seat 62 in this state, with the result that it is possible to push the outer ring 66 of the anti-friction bearing 64 in axially. Here, the lugs 14 are situated at the ends of the cut-out 84 which lie opposite one another in the circumferential direction.

Furthermore, it can be seen in FIG. 5 that the radial depth of the bearing-seat radial groove 74 is not continuously uniform over the circumference. Instead, the radial depth of the bearing-seat radial groove 74 is smallest at an end which lies diametrically opposite the lugs 14, as shown at 90 in FIG. 5. The radial depth 90 increases in each case continuously over the circumference towards the two lugs and has its greatest radial depth in a region centrally between the circumferential ends of the cut-out 84, as shown at 92 in FIG. 5. Since the mounting opening 80 intersects the bearing-seat radial groove 74 in this region, there is no longer a bearing-seat radial groove 74 there. The illustration in FIG. 5 serves to this extent merely for clarification that the radial depth increases continuously from the point 90 as far as the point 92 which lies diametrically opposite.

It is possible as a result to realize widening in an axial securing ring with a constant radial width 16, which widening firstly completely releases the bearing seat 62. Secondly, the cut-outs 84 and/or the bottom of the bearing-seat radial groove 74 ensure/ensures that the axial securing ring 10 can be stretched only as far as its maximum widening which is denoted by 38 in FIG. 1.

Figure 6:
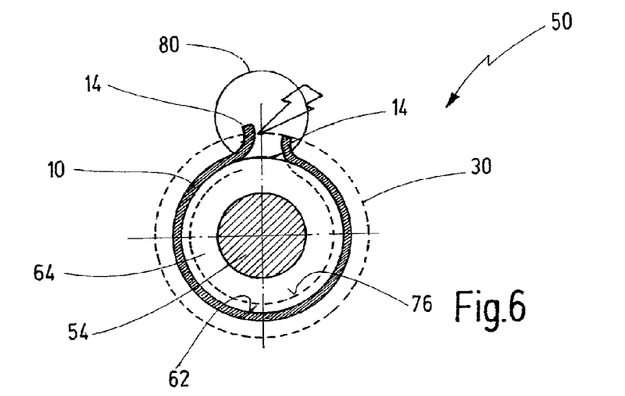
FIG. 6 shows a comparable illustration to FIG. 4 with an axial securing ring which is not completely latched in on one side.

FIG. 6 shows a comparable illustration to FIG. 4, the axial securing ring 10 not being latched correctly into the bearing radial groove 76 after the anti-friction bearing 64 is pushed into the bearing seat 62 and after said axial securing ring 10 is released. More precisely, the axial securing ring 10 is not latched completely into the bearing radial groove 76 in the region of one of its lugs, with the result that one lug 14 projects with respect to a circular shape 30 which indicates correct seating of the axial securing ring 10 in the bearing radial groove 76. This is indicated by an arrow in FIG. 6.

A position of this type can be checked via the mounting opening 80 in a simple way, whether by an engineer or by automated visual detection means.

This is possible, in particular, because the free ends 28 of the lugs 14 of the axial securing ring 10 lie on a circular shape 30 in the relieved state, as shown in FIG. 1, with the result that automated detection of this type is possible even when the axial securing ring 10 is situated in different rotational positions (in the context of the movability of the lugs 14 in the relieved state within the circumferential section 86 of the cut-out 84).

Figure 7:
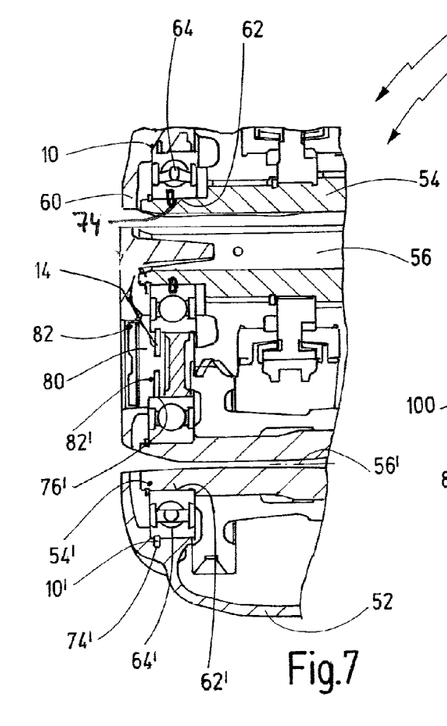
FIG. 7 shows a diagrammatic longitudinal sectional view through a further embodiment of a bearing arrangement according to the invention with two anti-friction bearings.
Figure 8:
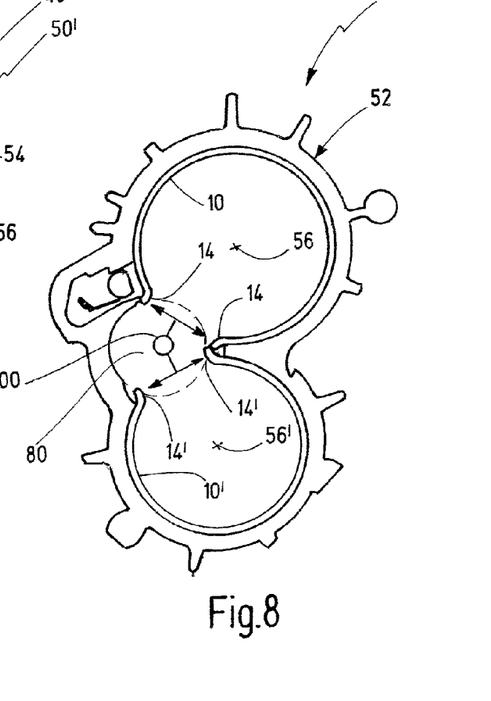
FIG. 8 shows a diagrammatic cross-sectional view of a bearing arrangement which corresponds to the embodiment from FIG. 7.

FIGS. 7 and 8 show a further embodiment of a motor vehicle gearbox 40' which has a bearing arrangement 50'. With regard to construction and method of operation, the bearing arrangement 50' corresponds generally to the bearing arrangement 50 of FIGS. 1 to 6. Identical elements are therefore identified by identical reference numerals. The differences will substantially be explained in the following text.

The bearing arrangement 50' has a housing cover 60, on which a second bearing seat 62' which is offset in parallel is configured next to the bearing seat 62. Furthermore, the bearing arrangement 50' comprises a further shaft 54', on which a further anti-friction bearing 64' is fixed by means of an axial fixing means which is not denoted in greater detail. Furthermore, the bearing arrangement 50' comprises a further axial securing ring 10' which engages into a bearing-seat radial groove 74 in the region of the further bearing seat 62', and the further axial securing ring 10' engages firstly into said bearing-seat radial groove 74' and into a bearing radial groove 76' of the further anti-friction bearing 64'.

The mounting opening 80 is arranged between the two shaft axles 56, 56', as can also be seen in FIG. 8.

The two axial securing rings 10, 10' are arranged here in such a way that their lugs 14, 14' lie in the region of the mounting opening 80. FIG. 8 shows the two axial securing rings 10, 10' in the widened state. In both cases, in each case one suitable cut-out 84 is also provided in the region of the bearing-seat radial groove 74, which can likewise be seen in FIG. 8.

In order to mount the gearbox components including the shafts 54, 54' and the anti-friction bearings 64, 64' which are fixed thereon, the two axial securing rings 10, 10' are widened at the same time, to be precise by means of a tool 100 which is indicated diagrammatically in FIG. 8. After the insertion of the anti-friction bearings 64, 64' into the respective bearing seat 62, 62', the axial securing rings 10, 10' are released by the tool 100, with the result that they latch into the respective bearing radial grooves 76, 76', to be precise in each case in such a way as shown in FIGS. 4 and 5.

It is possible in general also to operate further axial securing rings via a mounting opening 80 of this type, for example in a gearbox having three shafts.

Furthermore, it is possible that the bearing-seat radial grooves 74, 74' are arranged offset with respect to one another in the axial direction, which is indicated only slightly in FIG. 7. However, the offset can also be such that the axial securing rings 10, 10' are spaced apart from one another in the axial direction. This can facilitate individual widening of the axial securing rings 10, 10'. Furthermore, this can prevent the lugs 14, 14' of the two axial securing rings 10, 10' impeding one another during widening.

Instead of simultaneous widening of the axial securing rings 10, 10' by means of a tool 100, the shafts 54, 54' with the anti-friction bearings 64, 64' fixed thereto can also be mounted one after another, to which end the respective axial securing rings 10, 10' are widened in each case one after another.

The visual inspection of the correct seating of the axial securing rings 10, 10' can take place in a step via the mounting opening 80.

After this check, the cover 82' of the mounting opening 80 can be mounted again, in order to seal the housing 52 again in a fluid-tight manner.

The invention claimed is:

1. A bearing arrangement having:
   a bearing carrier which has a bearing seat with a bearing-seat radial groove,
   an anti-friction bearing which has a bearing radial groove on a bearing ring and which is inserted into the bearing seat,
   an axial securing ring which engages into the bearing-seat radial groove and into the bearing radial groove, in order to secure the anti-friction bearing axially in relation to the bearing carrier, the axial securing ring is configured as an open ring with radially projecting lugs,
   wherein the bearing seat has a seat axis and the bearing-seat groove has a radial groove axis, the radial groove axis being offset eccentrically with respect to the seat axis, and
   wherein the bearing carrier is a housing with a housing cover, a mounting opening configured in the housing cover, the mounting opening allows access to the lugs of the axial securing ring via the mounting opening, in order to elastically deform the axial securing ring for the purpose of mounting or dismantling the anti-friction bearing.

2. The bearing arrangement according to claim 1, wherein the housing cover is formed at one axial end of the housing, and wherein the bearing seat is formed on an inner side of the housing cover.

3. The bearing arrangement according to claim 1, wherein the mounting opening is configured eccentrically with respect to the seat axis of the bearing seat.

4. The bearing arrangement according to claim 1, wherein at least one cut-out for the lugs of the axial securing ring is configured on the housing, the at least one cut-out is configured radially adjacently with respect to the bearing-seat radial groove and extends over a circumferential section which makes a relative movement of the lugs in a circumferential direction possible, in order to elastically deform the axial securing ring for the purpose of mounting or dismantling the anti-friction bearing.

5. The bearing arrangement according to claim 4, wherein the at least one cut-out is delimited in the circumferential direction, in order to set up an anti-rotation safeguard for the axial securing ring.

6. A bearing arrangement, having:
   a bearing carrier which has a bearing seat with a bearing-seat radial groove,
   an anti-friction bearing which has a bearing radial groove on a bearing ring and which is inserted into the bearing seat,
   an axial securing ring which engages into the bearing-seat radial groove and into the bearing radial groove, in order to secure the anti-friction bearing axially in relation to the bearing carrier, the axial securing ring is configured as an open ring with radially projecting lugs, the bearing carrier has a second bearing seat with a second bearing-seat radial groove, a second anti-friction bearing which has a second bearing radial groove on a bearing ring inserted into the second bearing seat, a second axial securing ring engaging into the second bearing-seat radial groove and into the second bearing radial groove, in order to axially secure the second antifriction bearing,
   wherein the bearing carrier being a housing with a housing cover, a mounting opening configured in the housing cover, the mounting opening is configured to allow access to the radially projecting lugs of the axial securing ring and to radially projecting lugs of the second axial securing ring via the mounting opening in order to elastically deform the axial securing rings for mounting or dismantling at least one of the first and second anti-friction bearings.

7. The bearing arrangement according to claim 6, wherein the first and the second bearing-seat radial groove are arranged offset in an axial direction.

* * * * *